United States Patent [19]

Guidat

[11] Patent Number: 4,528,037

[45] Date of Patent: Jul. 9, 1985

[54] METHOD OF MANUFACTURING HEAT INSULATING AGGREGATES OR PELLETS AND PRODUCT THUS OBTAINED

[76] Inventor: Gilbert R. Guidat, 14, rue Jean Bioletti, Saint Laurent FR 88000 - Epinal, France

[21] Appl. No.: 559,693

[22] Filed: Dec. 9, 1983

Related U.S. Application Data

[63] Continuation-in-part of Ser. No. 438,852, filed as PCT FR 82/00027, Feb. 12, 1982, published as WO82/02710 Aug. 19, 1982, § 102(e) date Oct. 12, 1982, abandoned.

[30] Foreign Application Priority Data

Feb. 12, 1981 [FR] France ................................ 81 02941
Oct. 18, 1982 [FR] France ................................ 83 16674
Dec. 9, 1982 [FR] France ................................ 82 20814

[51] Int. Cl.$^3$ ............................................. C04B 19/04
[52] U.S. Cl. .................................... 106/81; 106/93; 106/99; 106/288 B; 427/212; 427/317; 427/421; 428/403; 252/62
[58] Field of Search .......... 106/80, 81, 92, 93, 106/99, 288 B; 427/212, 317, 421; 428/403

[56] References Cited

U.S. PATENT DOCUMENTS

| 2,377,484 | 6/1945 | Elmendorf | 106/81 |
| 3,748,160 | 7/1973 | Carbajal | 106/99 |
| 4,166,749 | 9/1979 | Sterrett et al. | 106/99 |

*Primary Examiner*—James Poer
*Attorney, Agent, or Firm*—Cushman, Darby & Cushman

[57] ABSTRACT

A process for manufacturing stabilized elementary particles of lignocellulose material includes, in sequence, the following operations: mechanically reducing with a cutter, crushing with a hammer mill, grading, subjecting to heat treatment by passage in a rotary furnace at a temperature decreasing from 800° C. to 75° C., subjecting to chemical impregnation-absorption-precipitation treatment by successive actions on a hot product and by spraying of a soluble calcium salt and a silicate, drying, and stabilizing. The invention finds use in the fields of construction, agriculture, horticulture, and related fields.

15 Claims, 1 Drawing Figure

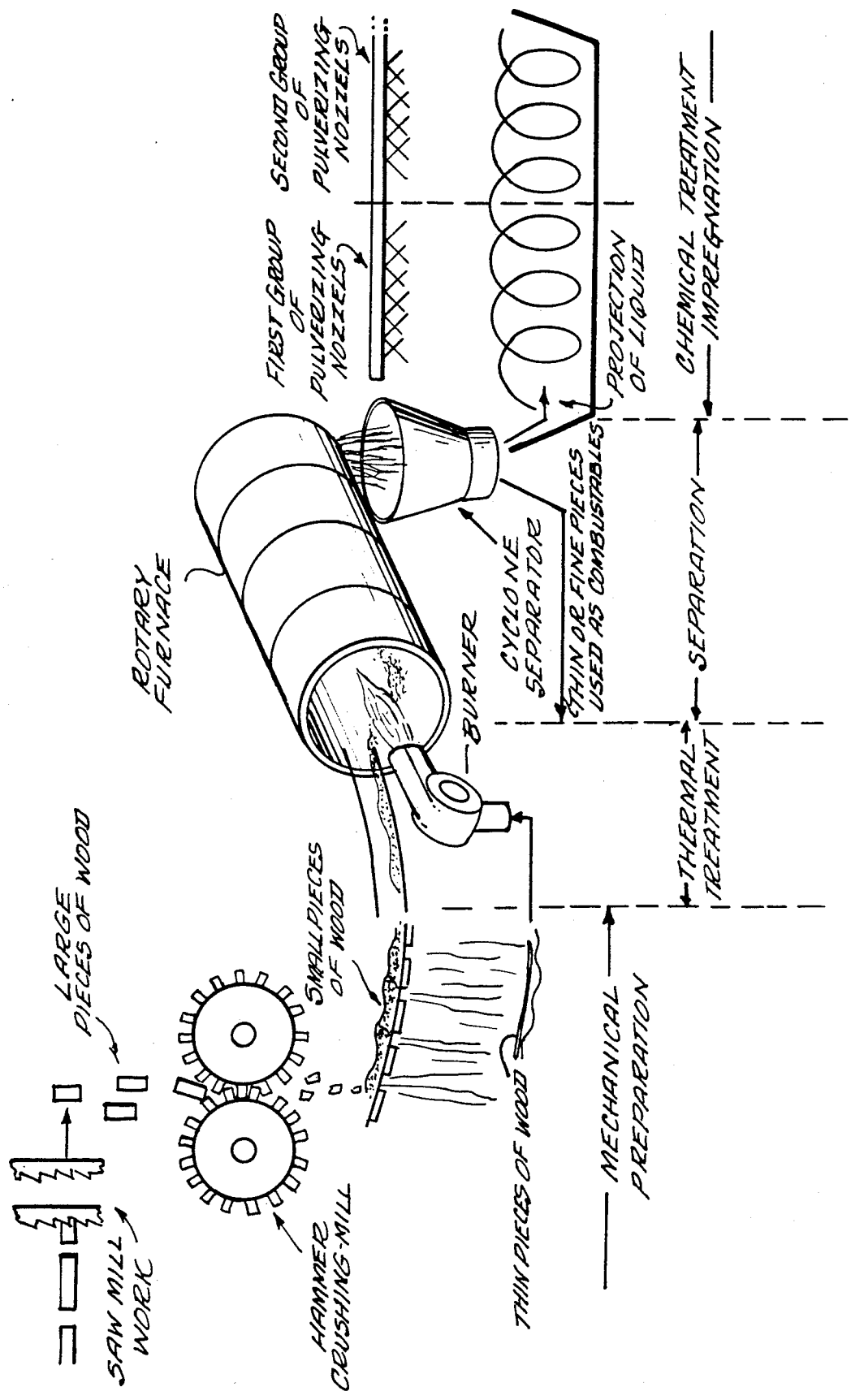

METHOD OF MANUFACTURING HEAT INSULATING AGGREGATES OR PELLETS AND PRODUCT THUS OBTAINED

This is a continuation-in-part of U.S. Ser. No. 438,852, filed as PCT FR 82/00027, Feb. 12, 1982, published as WO 82/02710 Aug. 19, 1982, § 102(e) filed Oct. 12, 1982, now abandoned, the entire disclosure of which is hereby incorporated by reference and relied upon.

FIELD OF THE INVENTION

This invention relates to an industrial process for manufacturing stabilized elementary particles from lignocellulose wastes of all types, but in particular wood waste, and to the product thus produced.

BACKGROUND OF THE INVENTION

Continual efforts have been made with varying degrees of success to incorporate lignocellulose materials, particularly wood wastes, in building materials such as cements and concretes. In general, a homogeneous mixture is prepared from cement and standard building materials and raw or treated lignocellulose wastes are incorporated therein. These lignocellulose wastes exhibit a variety of physical shapes, depending on the qualities and properties desired in the resulting product.

To accelerate setting the cement, calcium chloride or other equivalent salt may be added in varying proportions. This adjuvant is well known in construction and is almost universally used in concrete production plants. It contributes to obtaining a homogeneous mixture and to bonding the lignocellulose materials and cement together thoroughly to form a compact, solid product.

Even though special care may be taken in making these products, it is generally not, however, possible to avoid the subsequent development of various behavioral deficiencies therein which are linked to the structure of the lignocellulose materials themselves. That is, the deficiencies stem from the fact that lignocellulose materials never completely lose their ability to vary dimensionally, slide, and create fissures.

Viewed alternatively, it is well known to those skilled in the construction art that stability and relative inertness of building materials are essential qualities which are highly sought after and valued. Unfortunately, the products described above along with those disclosed in numerous patents do not meet these building criteria because they do not exhibit the ability to remain constant over long time periods, i.e. they are not stable and inert. To the contrary, these products, even though they may be well known and widely available commercially, generally enjoy only limited use because their initial properties-thermal insulation, mechanical resistance and sound insulation-degrade with time.

SUMMARY OF THE INVENTION

The product according to this invention differs widely from the above products because it is, in effect, a true raw material in the same way as sand, gravel, and other components of concretes and mortars. Therefore, it may be used directly as normal fill, or it may be compacted or molded. This raw material not only can be used in staple mixtures used in construction such as concrete and mortar, but also can be incorporated in semifinished products such as composite agglomerated construction blocks, walls, partition panels and boarding.

The useful characteristics of the product may be listed as follows:

It is stable and inert, and exhibits all wood qualities which are sought after and valued in construction.

Its manufacturing process consists in devitalizing and dimensionally and chemically stabilizing the wood while maintaining the qualities normally desired in a wood product.

The product is also fire-resistant. The fire resistance is indeed surprising inasmuch as the product is formed from treated wood. As such, it can be used to make protective layers or fireproof panels.

It is a chemically neutral product which does not attack concretes and mortars as do many presently used additives.

Its pH is close to 7. Thus, the product can be considered to be an inactive or "spectator" component.

Additionally, the product exhibits a great number of applications spanning a field of uses which has in turn proven to be particularly broad. For example, in addition to its multiple uses in construction as thermal insulation, as fire-protective elements and coatings, and as heat accumulators, the product is also very useful for use in improving crop growth media, particularly heavy and difficultly permeable soils, and can considerably increase yields of hydroponic crops. The reason for this is that the product retains water and aerates soils, and thereby promotes metabolism by vegetation.

Moreover, the product may be used in all standard applications involving making panels and prefabricated blocks which normally employ wood and wood wastes as raw maerials. It also constitutes an ideal ground cover and thus can be used to make slabs or continuous coverings such as paths, tennis courts, etc. In general, the product's dimensional stability allows it to be used in quite widely varying mechanical applications.

The product according to the invention remedies conventional deficiencies of mixtures which use a base of wood and cement and which, although once reasonably widely known to the construction art, have been largely abandoned in favor of more traditional materials.

This invention further provides a process for industrially manufacturing stabilized elementary particles from lignocellulose wastes, and particularly from wood wastes. The process includes mechanical steps (prior to grading) of cutting and crushing, followed by a sterilizing heat treatment by passage in the flame of a burner and along a rotary furnace. The process further requires a chemical impregnation-absorption treatment with a calcium salt solution, followed by spraying with a silicate solution and, optionally, incorporating a black dye in the particles during this last impregnation-absorption-spraying phase.

As previously mentioned, the preferred waste material is wood wastes, including wood chips and bark. It should be noted, however, that any lignocellulose waste, for example vegetable fibers, can serve as a source material.

As already indicated above, the numerous qualities and properties of this product—it is thermally and acoustically insulating, stable, non-rotting, nonflammable and lightweight—open it up to a wide range of applications, some examples of which are indicated immediately following:

filling insulation in construction and industrial applications;
outside insulation of houses and buildings;

absorber for solar collectors and heat accumulator for water heaters;

construction applications as raw material for fabricating light, elastic, nailable mortars and concretes;

thermal and acoustic insulation and hygroscopic absorber;

raw material to be mixed with various hydraulic binders and all synthetic resins for making a wide variety of agglomerates such as building blocks (e.g., framing blocks, lintels) and prefabricated components (panels, partitions, composite carrying walls, facade insulating panels);

fire insulation used in, for example, rough masonry surfaces;

application in farming and gardening arts, e.g. as a crop substrate which contributes to regulating temperature and soil water retention, and to improving oxygenation.

Moreover, the process for manufacturing the product of this invention meets present desires in our industrial economy, namely finding constructive uses for waste materials while consuming low amounts of energy.

Other characteristics and advantages are given in the description below of two basic variants of the process.

DETAILED DESCRIPTION

The process of the invention will now be described using, as an example of raw material, wood wastes that are large enough to require mechanical reduction such as branches, poles from thinning or clearing, lumbering remnants, limbs, tops, sawmill wastes, etc. The description relates to an installation with a capacity of 250 m$^3$/day. Of course, some variations and adaptations would be necessary if capacity was to be increased.

The invention may further be understood by reference to the FIGURE which illustrates the individual processes therein.

1. Mechanical Treatment

The wood, its bark and its sapwood undergo a first mechanical treatment by a cutter intended to form slices about 10×20×5 mm. These slices are then placed in a hammer mill having two hammer-carrying disks which rotate in the same direction at a speed on the order of 3000 rpm. The mill performs the necessary hammering and grinding. Grading of the existing pieces is then performed with screens for receiving the product. The graded product is then evacuated by suction or any other means to a rotary furnace to undergo heat treatment. The size of the graded elementary particles or fragments may vary slightly as a function of the planned application: industry, thermal insulation, agriculture, horticulture, etc. Fines, i.e., dusts and very small particles are recovered as the hammer mill output.

The crushed and ground wood is generally in the form of particles elongated in the direction of the fibers. Of course, other forms are possible within the context of particular applications.

The size of these elementary particles can vary between:
 1-10 mm in length and width
 1-5 mm in height.

Depending on the type of application, the following approximate sizes will be preferred:
 industry and construction (insulation, heat accumulation)
  5-10 mm in length
  1-4 mm in width
  2-5 mm in height
 crop substrate:
  5-10 mm in length
  1-3 mm in width
  1-4 mm in height.

2. Heat Treatment

The wood, thus divided, is projected in front of the flame of the burner in a linear rotary furnace, through which the divided wood passes in about three minutes.

The wood pieces are first admitted in front of the flame and then projected along the furnace to the intake of an Archimedean screw which carries them at a slow speed to the furnace outlet. During passage, the temperature slowly decreases from intake to outlet. By way of illustration, the temperature at the furnace input is generally between 700° and 800° C. but drops, by the time the outlet is reached, to around 75° C. The speed of advance in the furnace is 3 meters/minute for a fuel oil or gas burner with a power of 100,000 Kcal/h.

In case of an application as a crop substrate, the time for passage through the furnace should be set at about five minutes instead of three.

The heat treatment and flaming cause degasification of the wood particles, self-combustion of the resin without calcination, coagulation of tannins and phenols, and, generally, sterilization, partial distillation and expansion of the wood. During self-combustion, steam and alcohol evolution causes the fibers to burst. In addition, during the heat treatment mosses, lichens and parasites of all types are eliminated. The pieces of wood come out perfectly sterilized.

The heat treatment advantageously opens the pores in the wood, like a sponge or synthetic foam having an open microcellular structure, in preparation for subsequent treatment (to be described) during which the wood is thermally impregnated.

The pieces of wood, leaving the furnace at a temperature of about 75° C., undergo an intermediate elimination grading of the fines in a separator to eliminate undersized particles generated during heat treatment. The fines, i.e., particles with a section between 0 and 1 mm$^2$ may be recovered, for example by gravity with a dust filter and taken to the burner to be used as fuel.

3. Impregnation-Absorption-Precipitation Treatment:

a. Negative Impregnation With A Calcium Salt Solution

The product is then taken at ambient temperature and admitted into a linear screw malaxer where it undergoes a negative impregnation by a first wetting with a calcium salt solution, preferably calcium chloride, in a concentration equal to about 50 kg of pure salt per m$^3$ of water, i.e., a concentration of about 5% by weight. Although the 5% concentration is preferred, the concentration of calcium salt can vary within limits of 2 to 10% depending upon the intended application and the nature of the wood. For example, for an insulation application, the concentration can be increased depending on the degree of fire resistance desired.

Wetting is performed at ambient temperature, an amount of salt solution between 2 and 20%, but preferably about 5%, by volume of the treated product being added thereto until complete penetration and absorption is achieved. The solution temperature should initially be equal to ambient temperature, i.e., 10°-30° C., and the product temperature should initially (i.e., just prior to wetting) be between 30° C. and 60° C. Preferably, the product should be at a temperature of about 40° C., i.e., the temperature reached as the product travels at ambient temperature from the furnace outlet to be wetted. The wetting or spraying is performed continuously during malaxing by a high spraying ramp placed along the malaxer until saturation during the advance to the malaxer.

The speed of rotation of the screw is adjusted so that the product advances in the malaxer at a speed of about 3 m/min. It is estimated that saturation is reached at the end of 2 to 5 minutes.

The first impregnation, performed hot, completely expands the wood pores previously opened by mechanical treatment and cleared by heat treatment. The complete opening of the pores enables later treatment (described hereinafter) to be performed perfectly to the very heart of the wood.

b. Positive Impregnation by a Silicate Solution and Precipitation

As soon as the wood enters the second linear part of the malaxer, a solution of an alkali metal silicate of the same concentration as the calcium salt solution is then made to act by spraying at ambient temperature, from an upper ramp, in an amount between 2 and 15% by volume of the wood, but preferably about 10%. The salt used for the treatment may be a solution of sodium silicate or potassium silicate in a concentration between 2 and 15% by weight but preferably 10%. The salt selected depends on the intended application. The spraying should be performed while the product is at a hot temperature between, i.e. 30° and 60° C., and preferably at about 50° C.

The wetting is performed for the treatment period of the product, i.e., about 3 minutes. A chemical reaction then occurs within a few minutes. During this reaction, calcium silicate is formed in the deepest part of the wood and acts to block the pores and line the microcavities. The reaction causes, in effect, a petrification by this hard and stable salt which results in complete devitalization of the wood and implements a notable increase in its physical and chemical resistance. The pH of the wood, which at the beginning was between 4 and 5, is brought at the output to a value of between 6.8 and 7, i.e., equal to neutrality.

Thus, an inert, chemically neutral product is formed which exhibits all the physical properties of wood, such as insulation, but also, to a lesser degree, those of stone such as fire resistance.

The product may then be drained and dried in the open air or indoors depending on weather conditions. After a stabilization period of about 48 hours during which fixing and hardening occurs, the product is ready for packaging or bulk loading for any of the many uses previously enumerated.

As a variation, the order of addition of the calcium salt and silicate can be reversed. This reversal results in a product closer to wood and its properties.

The product can also by dyed black which makes it possible to increase its efficiency as a heat absorber and accumulator by attenuating radiation losses. Dyeing the product black can be performed as follows:

A small amount of alkali metal silicate which is not stoichiometrically sufficient to cause total precipitation is made to react with the impregnated calcium salt. Additional silicate is then added as a second phase in the form of a mixture with a black dye. The silicate will precipitate with the unreacted calcium chloride remaining free on the outside of each elementary particle and include the dye therein, thus forming a black dye-containing silicate shell on the outside of each particle. In essence, the silicate acts to fix the dye on the product and to make it practically indelible.

For example, the silicate can first be added in an amount which is half that needed to completely precipitate the calcium, and the other half containing the black dye can be added in a final phase.

It is also, of course, possible if so desired to reverse the order for adding the salts and incorporate the black dye in the calcium chloride, still achieving the same effect of indelibly dyeing the particles.

The entire disclosures of French application No. 82 20814 filed Dec. 9, 1982 and application No. 83 16674 filed Oct. 18, 1983 are herein incorporated by reference and relied upon.

Although only a few exemplary embodiments of this invention have been described in detail above, those skilled in the art will readily appreciate that many modifications are possible in the exemplary enbodiments without materially departing from the novel teachings and advantages of this invention. Accordingly, all such modifications are intended to be included within the scope of this invention as defined in the following claims.

What is claimed is:

1. A process for manufacturing stabilized particles from lignocellulose material, comprising:
   mechanically crushing said lignocellulose material to form lignocellulose particles within a desired range of dimensions;
   heat treating said particles at a temperature which is caused to decrease from about 800° C. to about 75° C. during said heat treatment; and
   subjecting said heat-treated particles to chemical reaction treatment including the steps of:
   1. spraying said particles with a calcium salt solution; and
   2. spraying said particles with an alkali metal silicate solution, whereby calcium silicate is formed.

2. The process of claim 1 wherein said lignocellulose material is lignocellulose waste.

3. The process of claim 1 wherein said calcium salt is calcium chloride.

4. The process of claim 1 wherein said alkali metal silicate is selected from the group consisting of sodium silicate and potassium silicate.

5. The process of claim 1, further comprising the step of dyeing said particles.

6. The process of claim 5, wherein said dyeing is effected by
   adding, in first stage, an amount of said alkali metal silicate solution insufficient to precipitate all calcium added from said calcium salt solution; and
   adding, in a second stage, an additional amount of alkali metal silicate solution sufficient to complete said precipitation, said additional amount of solution also containing a dye.

7. The process of claim 1, wherein the concentration of said calcium salt solution is between about 2 and about 10% by weight.

8. The process of claim 7, wherein said concentration is about 5%.

9. The process of claim 1 wherein the concentration of said alkali metal silicate solution is between about 2 and about 15% by weight.

10. The process of claim 1 wherein said alkali metal silicate solution is added to said heat treated particles and absorbed before addition of said calcium salt solution.

11. The process of claim 1 wherein and calcium salt solution is added to said heat treated particles and absorbed before addition of said alkali metal silicate solution.

12. The process of claim 1 wherein said heat treatment lasts for a time between about 3 and about 5 minutes.

13. The process of claim 1 wherein said sprayings are conducted continuously immediately following said heat treatment and by successive spraying ramps along a screw malaxer.

14. The process of claim 1 wherein said desired range of dimensions is
1–10 mm in length and width; and
1–5 mm in height.

15. The product produced by the process of claim 1.

* * * * *